US006874091B2

United States Patent
Min

(10) Patent No.: US 6,874,091 B2
(45) Date of Patent: Mar. 29, 2005

(54) LOW POWER CONSUMPTION COMPUTER PERIPHERAL DEVICE AND METHOD FOR REDUCING POWER CONSUMPTION

(75) Inventor: Byung-sun Min, Pyeongtak-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 09/916,317

(22) Filed: Jul. 30, 2001

(65) Prior Publication Data

US 2002/0091953 A1 Jul. 11, 2002

(30) Foreign Application Priority Data

Jan. 10, 2001 (KR) .......................................... 2001-1347

(51) Int. Cl.⁷ ................................................ G06F 1/26
(52) U.S. Cl. .................................... 713/300; 340/686.1
(58) Field of Search ............................... 713/320, 323, 713/300; 345/212

(56) References Cited

U.S. PATENT DOCUMENTS 5,675,810 A * 10/1997 Sellers ....................... 713/323
5,821,924 A * 10/1998 Kikinis et al. .............. 345/212
6,493,100 B1 * 12/2002 Endo et al. ................. 358/1.14
6,704,063 B1 * 3/2004 Van Der Wulp ............ 348/734

* cited by examiner

Primary Examiner—Thong Lee
Assistant Examiner—Vajirachai Komol
(74) Attorney, Agent, or Firm—Robert E. Bushnell, Esq.

(57) ABSTRACT

A computer peripheral device consuming less power and a method for reducing power consumption thereof are provided. The method for reducing power consumption of at least one or more computer peripherals connected to a computer so as to operate in conjunction with the computer, has steps of (a) determining whether or not the peripheral has a first power save mode; (b) determining whether or not the computer is turned on, if it is determined that the peripheral has the first power save mode; (c) determining whether or not a predetermined time period after the peripheral did not perform its unique function elapsed, if it is determined that the computer is turned on; and (d) making the peripheral enter into the first power save mode, if it is determined that the predetermined time period elapsed, or that the computer is not turned on, wherein the first power save mode corresponds to a state in which the peripheral consumes less power than when the peripheral is performing its unique function. Therefore, the peripheral can actively enter into or exit from the first power save mode, and therefore can reduce unnecessary power consumption in at least one or more peripherals which are used dependently on the computer.

15 Claims, 3 Drawing Sheets

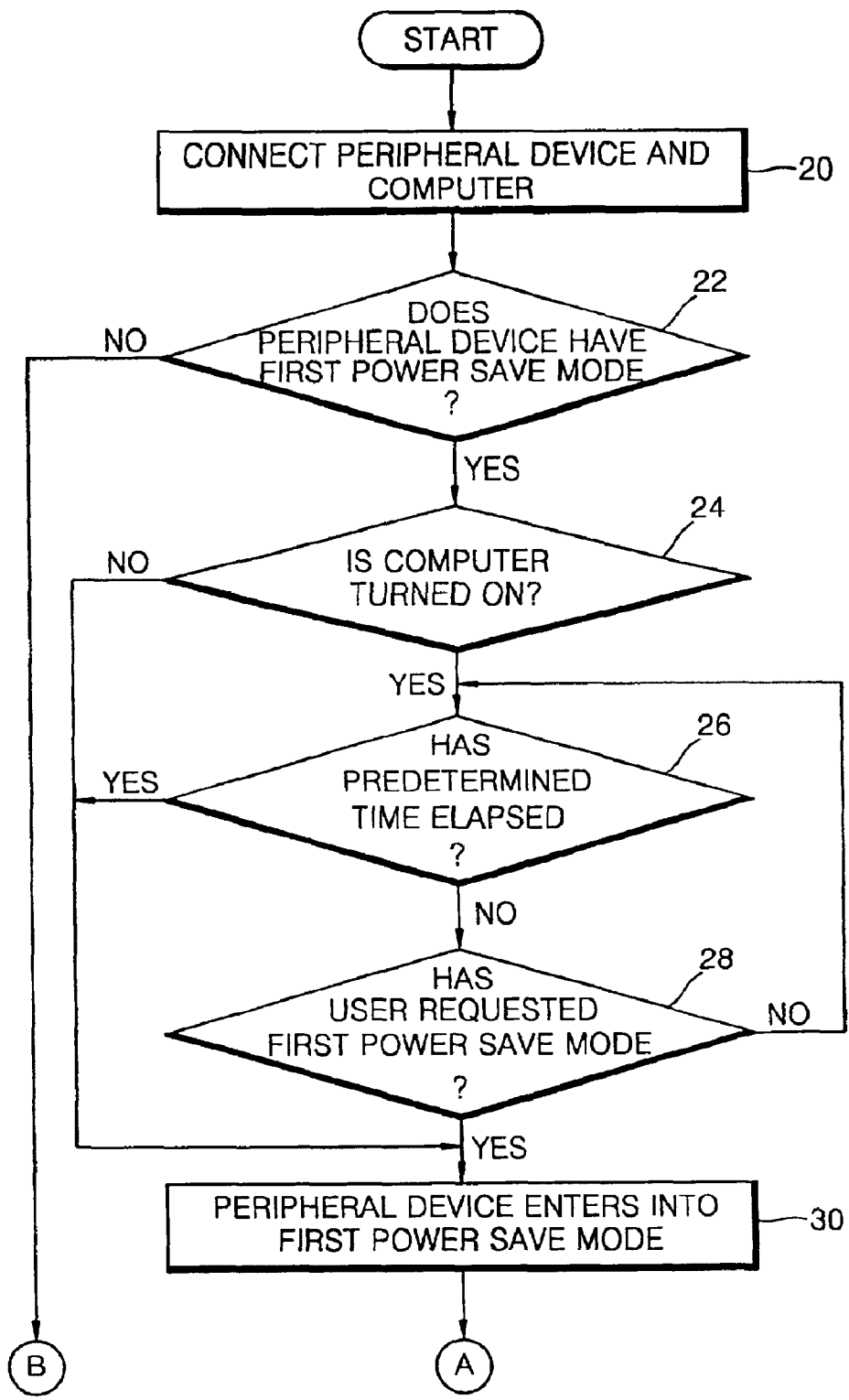

LOW POWER CONSUMPTION COMPUTER PERIPHERAL DEVICE AND METHOD FOR REDUCING POWER CONSUMPTION

CLAIM OF PRIORITY

This application makes reference to, incorporates the same herein, and claims all benefits accruing under 35 U.S.C §119 from an application entitled Computer Peripheral Apparatus Consuming Low-Power And Method For Reducing Power Consumption Thereof earlier filed in the Korean Industrial Property Office on Jan. 10, 2001, and there duly assigned Serial No.2001-1347 by that Office.

BACKGROUND OF THE INVENTION

1. Field of the Invention

The present invention relates to computer peripheral devices such as a printer, and more particularly, to a low power consumption computer peripheral device and a method for reducing power consumption therein.

2. Description of the Related Art

From the standpoint of power consumption, a conventional computer peripheral device such as a printer, does not operate interlocked with a computer, but independently operates and enters into a power save mode. Here, power save mode means a state in which a peripheral consumes less power than in a normal operating mode, and does not mean that the power supply to the peripheral is completely cut off. For example, a conventional computer peripheral device having a power save mode can enter into a power save mode only when the peripheral is not performing its unique function for a predetermined time period, or the user requests a power save mode through manual operation from the outside.

In conclusion, even after the computer is turned off, the conventional computer peripheral device unnecessarily consumes power until a predetermined time period after its unique function has ended, or the user changes the operational state of the peripheral device.

SUMMARY OF THE INVENTION

To solve the above problems, it is an object of the present invention to provide a method for reducing power consumption of a computer peripheral device. The apparatus which can rapidly reduce power consumption by operating in conjunction with the computer from the standpoint of power consumption.

It is another object to provide a low power consumption computer peripheral device that uses the method for reducing power consumption.

To accomplish the above object of the present invention, there is provided a method for reducing power consumption in a computer peripheral device, in at least one or more computer peripheral devices connected to a computer so as to operate in conjunction with the computer, the method having the steps of (a) determining whether or not the peripheral has a first power save mode; (b) determining whether or not the computer is turned on, if it is determined that the peripheral has the first power save mode; (c) determining whether or not a predetermined time period has elapsed since the peripheral has ended its unique function, if it is determined that the computer is turned on; and (d) making the peripheral device enter into the first power save mode, if it is determined that the predetermined time period has elapsed, or that the computer is not turned on, in which the first power save mode corresponds to a state in which the peripheral consumes less power than when the peripheral is performing its unique function.

To accomplish another object of the present invention, there is also provided a computer peripheral device consuming less power in a system having a computer, at least one or more peripheral devices operating in conjunction with the computer, and communication cables connecting the computer with the peripheral devices, the computer peripheral apparatus having a power unit having a primary part for converting alternating current (AC) power input from the outside into direct current (DC) power, and a secondary part for providing the DC power as the power for the peripherals, in response to a power control signal; a counter for performing a counting operation in response to a counting-start signal, and outputting the counted result; a comparison unit for comparing the counted result with a predetermined time period, and outputting the compared result; and a control unit for outputting the power control signal in response to the compared result or a power identification signal, which has a predetermined level when the computer is turned on and is input from the communication cable, checking whether or not the unique function of the peripheral is performed, and outputting the counting-start signal in response to the checked result, in which the power identification signal has a level varying in response to the on/off power state of the computer.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein:

FIGS. 1A and 1B are a flowchart for explaining a preferred embodiment of a methodfor reducing power consumption of a computer peripheral device consuming less power according to the present invention.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1B:
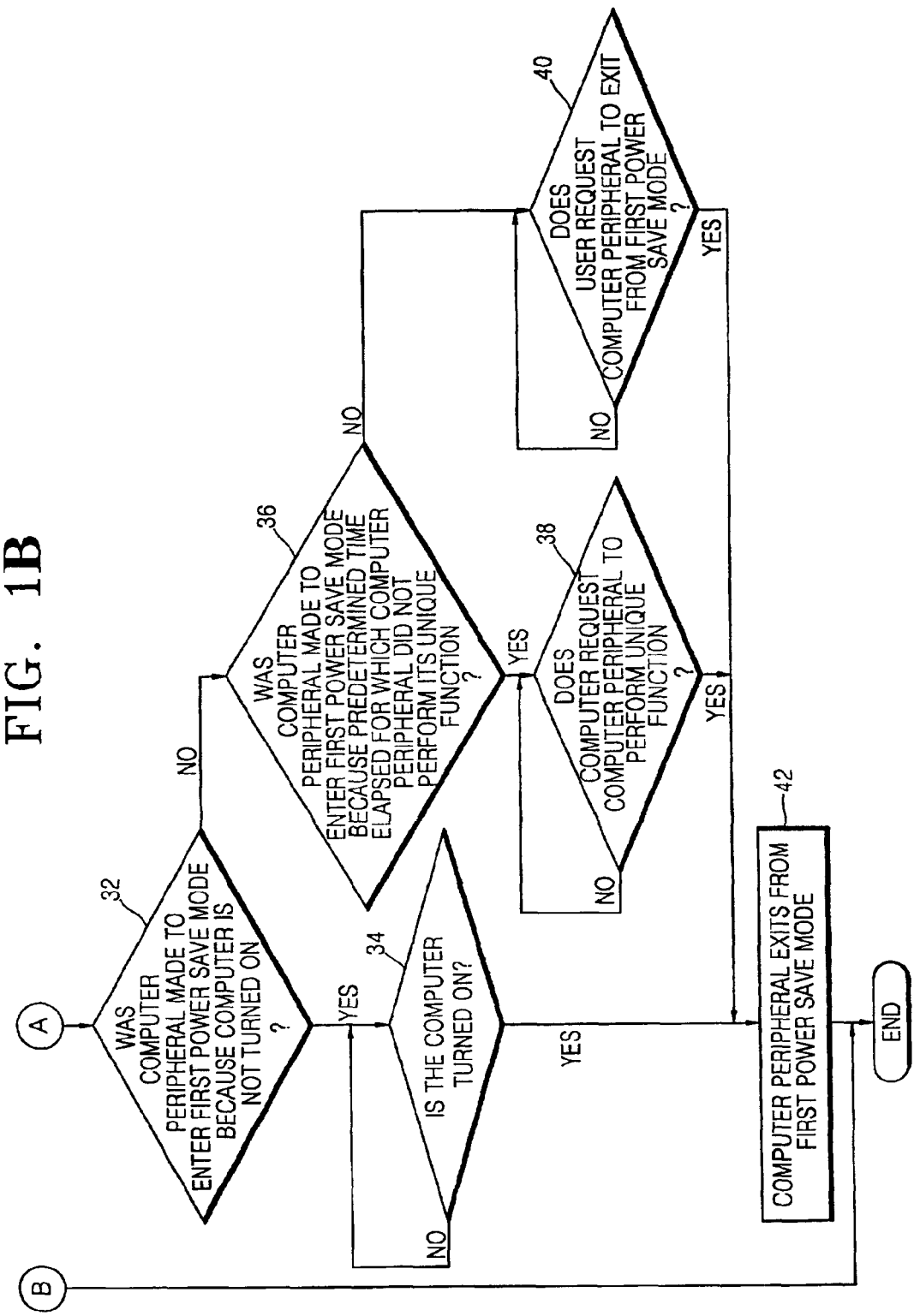

FIGS. 1A and 1B are a flowchart for explaining a preferred embodiment of a method for reducing power consumption of a computer peripheral apparatus according to the present invention. The method includes steps 20 through 30 for making a peripheral, which has a first power save mode, enter into the first power save mode, and steps 32 through 42 for making the peripheral exit from the first power save mode in response to whether or not the cause, by which the peripheral entered into the first power save mode, is removed.

The computer peripheral enters into a first power save mode in step 20 through 30. Here, the first power save mode is a state in which the computer peripheral device consumes less power than when the peripheral device performs its unique function. Therefore, in the first power save mode, power to the computer peripheral device is reduced, but not completely cut off. To do this, first, the computer is connected to at least one or more computer peripheral devices, each of which operates in conjunction with the computer in step 20. At this time the peripheral device is enabled to receive a command to enable it to perform its unique function.

After step 20, it is determined whether or not each computer peripheral has the first power save mode in step 22. If it is determined that a computer peripheral does not have the first power save mode, the method for reducing power consumption according to the present invention shown in FIGS. 1A and 1B is finished. However, if it is determined that a computer peripheral has the first power save mode, the computer peripheral determines whether or not the computer is turned on in step 24. Here, if power is not supplied to the computer, or the connection between the computer and the peripheral is cut off, it is determined that the computer is not turned on. Also, if the computer is in a power save mode, in which the computer consumes less power than when the computer is in a normal operating mode, it is determined that the computer is not turned on.

If it is determined that the computer is turned on, it is then determined, in step 26, whether or not a predetermined time has elapsed since the computer peripheral has last performed its unique function. For example, if the computer peripheral is a printer, it is determined whether or not a predetermined time period has elapsed after the last print operation was performed.

If it is determined that the predetermined time period, after the computer peripheral device has ended its unique function, has not elapsed, it is determined in step 28 whether or not a user requested that the computer peripheral enter into the first power save mode. Here, if it is determined that the user has not requested the computer peripheral device to enter into the first power save mode, the process returns to step 26, and steps 26 and 28 are is repeatedly performed until either the predetermined time period elapses or until the user requests the that the computer peripheral enter into the first power save mode. It should be understood here that if the peripheral device performs its unique function before the predetermined time period elapses, the predetermined time period is restarted.

If it is determined in step 24 that the computer is not turned on, or if it is determined in step 26 that the predetermined time period has elapsed, or if it is determined in step 28 that user has requested the computer peripheral device to enter into the first power save mode, step 30 is performed and the computer peripheral is made to enter into the first power save mode.

Alternatively, step 28 can be selectively excluded. For example, the method for reducing power consumption according to the present invention can exclude step 28, and in this case, it is determined in step 26 whether or not a predetermined time period has elapsed after the computer peripheral has ended its unique function. If it is determined that the predetermined time period has elapsed, step 30 is performed. Also, step 28 can be performed between steps 22 and 24, or between steps 24 and 26. Regardless of where step 28 is in the process, step 30 is performed when the user requests the computer peripheral to enter into the first power save mode.

As discussed above, if it is determined that the user requests that the computer peripheral enter into the first power save mode, if a predetermined time period has elapsed after the computer peripheral last performed its unique function or if it is determined that the computer is not turned on, the computer peripheral is made to enter into the first power save mode in step 30.

Meanwhile, after step 30, in order to leave the first power save mode, the process checks, in steps 32–42, for the condition that caused the peripheral device to enter into the first power save mode, and whether or not that condition has been removed.

Accordingly, in step 32 the process checks to determine whether the first power save mode was the result of step 24 determining that the computer was not turned on. If so, then step 34 repeatedly checks whether the computer has been turned on, and once the computer has been turned on the peripheral device exits from the first power save mode in step 42.

If it is determined in step 32 that the cause for entering into the first poser save mode was not due to the computer not being turned on, then in step 36 it is checked to determine whether the first power save mode was the result of step 26 determining that the predetermined time period had elapsed since the peripheral device last performed its unique function. If so, then step 38 repeatedly checks for a command signal from the computer requesting the peripheral device perform its unique function. When the command signal is detected by the peripheral device, the peripheral device exits from the first power save mode in step 42.

If it is determined in step 36 that the cause for entering into the first poser save mode was not due to the predetermined time period having elapsed since the peripheral device last performed its unique function, then is determined that the peripheral device entered into the first power save mode as a result of the user request in step 28. Accordingly, step 40 repeatedly checks for a user's request for the peripheral device to exit the first power save mode, and upon such a request the peripheral device exits from the first power save mode in step 42.

The structure and operation of a computer peripheral apparatus consuming less power, according to the present invention, which performs the method for reducing power consumption, will now be explained.

Figure 2:
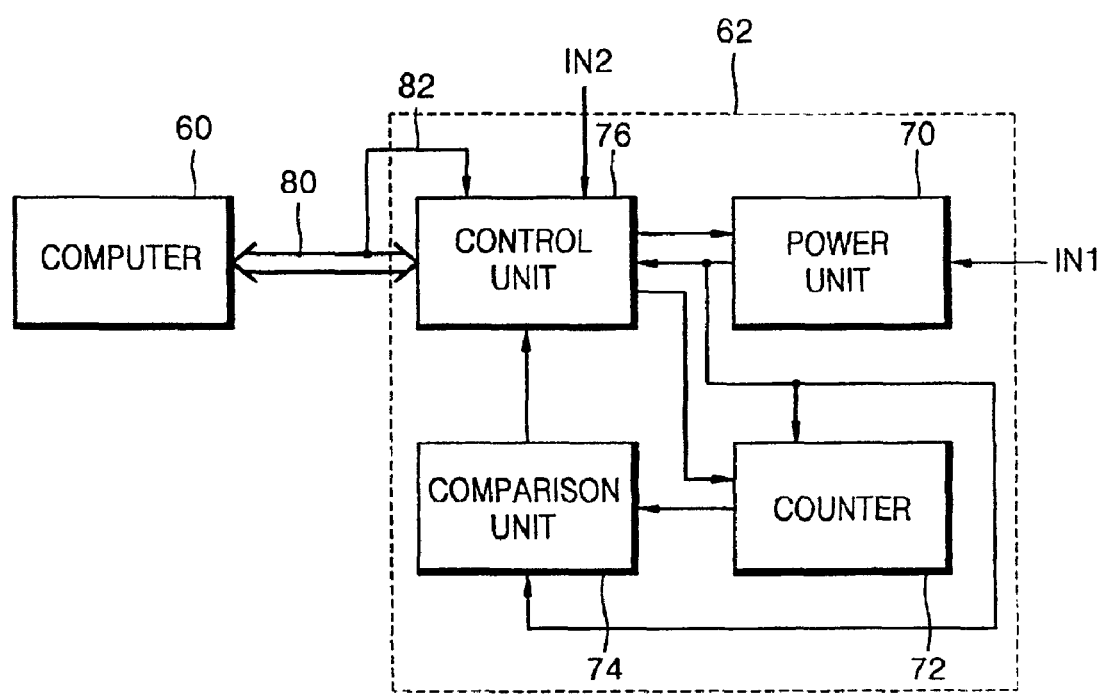
FIG. 2 is a block diagram of a computer peripheral apparatus consuming less power, according to the present invention, which performs the method for reducing power consumption shown in FIG. 1.

FIG. 2 is a block diagram of a computer peripheral device consuming less power, according to the present invention, which performs the method for reducing power consumption shown in FIGS. 1A and 1B. The computer peripheral device shown in FIG. 2 includes power unit 70, counter 72, comparison unit 74, and control unit 76.

Though one computer 60 and one computer peripheral device 62 are connected to each other in FIG. 2, a plurality of computer peripheral devices 62 according to the present invention can be connected to one computer 60. If a plurality of similar or uniquely different types of computer peripheral devices 62 are connected to one computer, each computer peripheral device has the same illustrated components as that of the computer peripheral device 62, according to the present invention, and each computer peripheral device controlled to perform its unique function by being linked to the computer via a communication cable 80.

The power unit 70 of the computer peripheral device 62 has a primary part (not shown) and a secondary part (not shown). Here, the primary part converts alternating current (AC) power, which is input through the input terminal IN1 from the outside, into direct current (DC) power, and outputs the DC power to the secondary part. In response to a power control signal output from the control unit 76, the secondary part outputs the DC power as power which each unit 72 through 76 of the computer peripheral device 62 needs.

To perform steps 24 and 30, the control unit 76 outputs a power control signal to the power unit 70 in response to a power identification signal 82, which has a predetermined level when the computer 60 is turned on and is input via the communication cable 80. For example, if the level of the power identification signal 82 is not at a predetermined level, the control unit 76 recognizes that the computer is not turned on, and outputs a power control signal, which controls the secondary part of the power unit 70 not to generate power needed in each unit 72 through 76 of the computer peripheral 62, to the power unit 70. Here, if the power unit 70 does not supply power to units 72 through 76 in response to the power control signal, the computer peripheral device 62 enters into the first power save mode.

At this time, since the computer 60 is determined to be turned off (step 24) due to the computer 60 being in its own power save mode (hereafter: second power save mode) or the connection between the computer 60 and the computer peripheral 62 is cut off, and the level of the power identification signal 82 is not the same as the predetermined level, the control unit 76 identifies (step 32) the cause for entering into the first poser save mode as being due to the computer 60 being turned off. Accordingly, control unit 76 continuously checks (step 34) for when the power identification signal 82 returns to the predetermined level, which will indicate that computer 60 is turned on. When it is determined that the computer 60 is turned on, control unit 76 controls the computer peripheral 62 to exit the first power save mode by outputting the power control signal, which controls the secondary part of the power unit 70 to provide power again to each unit 72 through 76 of the computer peripheral 62, to the power unit 70.

Meanwhile, the power identification signal 82 is a signal having a level which varies in response to whether the computer 60 is turned on or off. The power identification signal 82 will now be explained in detail.

A signal transmitted through one line (hereinafter, referred to as "an identification line") among a plurality of lines of the communication cable 80, through which data needed for performing the unique function of the computer peripheral 62 is transmitted from the computer 60 to the computer peripheral 62, is determined as the power identification signal 82. At this time, a line, which transmits signal having the greatest level change when the computer 60 is turned off, among the plurality of lines is determined as the identification line. The identification line is selected according to the type of communication cable 80 as explained below.

According to an embodiment of the present invention, the communication cable 80 can be individual cable which connects the computer 60 to each of the computer peripherals. For example, if a "1284 cable" having a strobe line, a busy line, and 8-bit data lines, is used as an individual cable, the power identification signal 82 is transmitted through an arbitrary data line selected as the identification line among the 8-bit data lines. This is because when the computer 60 is turned off, or in a second power save mode, a signal having a logic "low" level is not transmitted from the computer 60 to the computer peripheral 62 through data lines, and therefore, the computer peripheral 62 recognizes the power identification signal 82 as a logic "high" level. That is, if the power identification signal 82 is recognized as a logic "high" level, the control unit 76 of the computer peripheral 62 determines that the computer 60 is not turned on. However, if the computer 60 is turned on, a signal having a logic "low" level is transmitted from the computer 60 to the peripheral 62 through data lines. Therefore, if the power identification signal 82 is recognized as a logic "low" level, the control unit 76 can determine that the computer 60 is turned on.

According to another embodiment of the present invention, the communication cable 80 can be a common cable commonly connecting the computer 60 to the computer peripherals. For example, if a universal serial bus (USB) having a voltage bus (VBUS) and a ground line is used as the common cable, the power identification signal 82 can be input through the voltage bus corresponding to the identification line. This is because if the computer 60 is turned off, or the computer 60 is in the second power save mode, the power identification signal having a logic "high" level is not transmitted from the computer 60 to the peripheral 62 through the voltage bus, and therefore, the computer peripheral 62 recognizes that the power identification signal 82 is a logic "low" level. That is, if a power identification signal 82 having a logic "low" level is input, the control unit 76 of the computer peripheral 62 determines that the computer 60 is not turned on. However, if the computer 60 is turned on, a power identification signal 82 having a "high" logic level is transmitted from the computer 60 to the peripheral 62 through the voltage bus. Therefore, if the power identification signal having a logic "high" level is input through the voltage bus, the control unit 76 determines that the computer 60 is turned on.

As described above, when the computer 60 is turned on, the predetermined level of the power identification signal 82 becomes a logic "low" or logic "high" level according to the type of the communication cable.

Also, the control unit 76 checks whether or not the computer peripheral 62 performs its unique function, and in response to the result of checking, outputs a counting-start signal to the counter 72. At this time, in response to the counting-start signal provided from the control unit 76, the counter 72 performs a counting operation, and outputs the counting result to the comparison unit 74. The comparison unit 74 compares the counting result with the predetermined time period, and outputs the comparison result to the control unit 76. For example, if the level of the power identification signal 82 is the predetermined level, the control unit 76 determines (step 24) that the computer 60 is turned on, and checks the comparison result output by the comparison unit 74 to perform step 26.

That is, after the computer peripheral 62 performs its unique function a first time, the control unit 76 outputs the counting-start signal to the counter 72 so that the counter 72 starts a counting operation, and by checking the result compared in the comparison unit 74, recognizes whether or not the result counted in the counter 72 corresponds to the predetermined time period.

When it is determined that the result counted in the counter 72 is greater than the counting value corresponding to the predetermined time period, the control unit 76 outputs the power control signal which controls the secondary part of the power unit 70 not to generate power, to the power unit 70, thus the computer peripheral 62 enters into the first power save mode at step 30.

Accordingly, power control unit 76 determines (step 36) that the cause for entering into the first power save mode was the elapse of the predetermined time period since the computer peripheral last performed its unique function. At this time, control unit 76 continuously checks (step 38) for a request from computer 60 for the computer peripheral 62 to again performs its unique function. When such a request is detected, control unit 76 outputs, to power unit 70, the power control signal which controls the secondary part of power unit 70 to generate power to units 72–76.

Meanwhile, to perform steps 28 and 30, the control unit 76 receives a power save request signal, which requests the computer peripheral 62 to enter into the first power save mode, from the external user through the input terminal IN2, and in response to the received power save request signal, outputs, to the power unit 70, the power control signal which controls the secondary part of the power unit 70 to not provide power to each unit 72 through 76 of the computer peripheral 62.

Then, since power control unit 76 caused the computer peripheral 62 to enter into the first power save mode at the request of the user, was control unit 76 continuously checks for user input, via input terminal IN2, of a power save exit request signal (step 40), which requests the computer peripheral 62 to exit from the first poser save mode. When the power save exit request signal is detected, control unit 76 controls the secondary part of power unit 70 to provide power to units 72–76.

As described above, unlike a conventional computer peripheral, which constantly consumes power unnecessarily when the computer is turned off because the computer peripheral operates independently from the computer from the standpoint of power consumption, the computer peripheral apparatus, consuming less power and the method for reducing power consumption thereof according to the present invention, recognizes the power state of the computer 60 through the power identification signal 82 by the control unit 76, and can actively enter into or exit from the first power save mode, and therefore can reduce unnecessary power consumption in at least one or more peripherals 62 which are used dependently of the computer 60.

What is claimed is:

1. A method for reducing power consumption in a computer peripheral device, in at least one or more computer peripheral devices, each having a respective unique function, connected to a computer so as to operate in conjunction with the computer, the method comprising steps of:
   (a) determining whether or not the peripheral device has a first power save mode;
   (b) determining whether or not the computer is turned on, if it is determined that the peripheral device has the first power save mode, characterized in that it is determined that the computer is not turned on when the computer does not receive power, when the computer is in a second power save mode or when the connection between the computer and the peripheral device is cut off;
   (c) determining whether or not a predetermined time period has elapsed since the peripheral device has last performed its unique function, if it is determined that the computer is turned on; and
   (d) making the peripheral device enter into the first power save mode, if it is determined that the predetermined time period has elapsed, or that the computer is not turned on, wherein the first power save mode corresponds to a state in which the peripheral device consumes less power than when the peripheral device is in a normal operating state.

2. The method of claim 1, further comprising steps of:
   (e) determining whether the peripheral device was made to enter the first power save mode because the computer is not turned on;
   (f) continuously determining whether or not the computer is turned on, when it is determined in step (e) that the peripheral device was made to enter the first power save mode because the computer is not turned on; and
   (g) making the peripheral device exit from the first power save mode, when it is determined in step (f) that the computer is turned on.

3. The method of claim 1, further comprising a step of:
   (e) determining whether or not the user has requested that the peripheral device enter into the first power save mode if it is determined in step (c) that the predetermined time period after the peripheral device last performing its unique function has not elapsed, and returning to step (c) if it is determined that the user has not requested that the peripheral device enter into the first power save mode; and
   (f) performing the step (d), if it is determined in step (e) that the user requests that the peripheral device enter into the first power save mode.

4. The method of claim 3, further comprising steps of:
   (g) after step (d), determining whether the peripheral device was made to enter the first power save mode because the computer is not turned on;
   (h) continuously determining whether or not the computer is turned on, when it is determined in step (g) that the peripheral device was made to enter the first power save mode because the computer is not turned on; and
   (i) making the peripheral device exit from the first power save mode, when it is determined in step (h) that the computer is turned on.

5. The method of claim 4, further comprising steps of:
   (j) determining whether the peripheral device was made to enter the first power save mode because the predetermined time period had elapsed since the peripheral device has last performed its unique function, when it is determined in step (g) that the peripheral device was not made to enter the first power save mode because the computer is not turned on;
   (k) continuously determining whether or not the computer requests the peripheral device to perform its unique function, when it is determined that the peripheral device was made to enter the first power save mode because the predetermined time period had elapsed since the peripheral device has last performed its unique function; and
   (l) making the peripheral device exit from the first power save mode, when it is determined in step (k) that the computer requests the peripheral device to perform its unique function.

6. The method of claim 5, further comprising steps of:
   (m) identifying the cause which made the peripheral device enter into the first power save mode to be due to the user's request in step (e), and continuously determining whether or not the user requests the peripheral device to exit from the first power save mode; and
   (n) making the peripheral device exit from the first power save mode, when it is determined in step (m) that the user requests the peripheral device to exit from the first power save mode.

7. A computer peripheral device consuming less power in a system having a computer, at least one or more peripheral devices, each having a respective unique function, operating in conjunction with the computer, and communication cables connecting the computer with the peripheral devices, the computer peripheral device comprising:
   a power unit having a primary part for converting alternating current (AC) power input from the outside into direct current (DC) power, and a secondary part for providing the DC power as the power for the peripheral components, in response to a power control signal;

a counter for performing a counting operation in response to a counting-start signal, and outputting the counted result;

a comparison unit for comparing the counted result with a predetermined time period, and outputting the compared result; and a control unit for outputting the power control signal in response to the compared result or in response to a power identification signal indicative of a power state of the computer, which has a predetermined level when the computer is turned on and is input from the communication cable, said control unit checking whether or not the unique function of the peripheral device is performed, and outputting the counting-start signal when it is determined that the unique function of the peripheral device is performed.

8. The computer peripheral device of claim 7, wherein the control unit outputs the power control signal having a first logic level in response to a power save request signal or a second logic level in response to a power save exit request signal input from the outside.

9. The computer peripheral device of claim 7, wherein the communication cable is an individual cable, which connects the computer and the respective peripheral device, and the power identification signal is input via one data line among data lines of the individual cable.

10. The computer peripheral device of claim 7, wherein the communication cable is a common cable, which commonly connects the computer and at least one or more peripherals, and the power identification signal is input via a voltage bus of the common cable.

11. The computer peripheral device of claim 7, wherein the control unit:

determines whether or not the peripheral device has a first power save mode;

determines whether or not the power identification signal is indicative of the computer being in an on power state, if it is determined that the peripheral device has the first power save mode, characterized in that it is determined that the power identification signal is indicative of the computer being in an off power state when the computer does not receive power, when the computer is in a second power save mode or when the connection between the computer and the peripheral device is cut off;

determines whether or not said predetermined time period has elapsed since the peripheral device has last performed its unique function, if it is determined that the power identification signal is indicative of the computer being in an on power state; and makes the peripheral device enter into the first power save mode, if it is determined that the predetermined time period has elapsed, or that the power identification signal is indicative of the computer being in an off power state, wherein the first power save mode corresponds to a state in which the peripheral device consumes less power than when the peripheral device is in a normal operating state.

12. The computer peripheral device of claim 11, wherein the control unit:

determines whether the peripheral device was made to enter the first power save mode because the power identification signal was indicative of the computer being in an off power state;

continuously monitors the power identification signal to determine when the power identification signal is indicative of the computer being in an on power state, when it is determined that the peripheral device was made to enter the first power save mode because the peripheral device was made to enter the first power save mode due to the power identification signal indicating that the computer was in an off power state; and makes the peripheral device exit from the first power save mode, when it is determined that the power identification signal is indicative of the computer being in an on power state.

13. The computer peripheral device of claim 12, wherein the control unit:

determines whether the peripheral device was made to enter the first power save mode because the predetermined time period had elapsed since the peripheral device has last performed its unique function, when it is determined that the peripheral device was not made to enter the first power save mode due to the power identification signal indicating that the computer was in an off power state;

continuously checks for a computer request requesting the peripheral device perform its unique function, when it is determined that the peripheral device was made to enter the first power save mode because the predetermined time period had elapsed since the peripheral device has last performed its unique function; and makes the peripheral device exit from the first power save mode, when it is determined that the computer requests the peripheral device to perform its unique function.

14. The computer peripheral device of claim 13, wherein the control unit:

determines whether or not the user has requested that the peripheral device enter into the first power save mode; and makes the peripheral device enter the first power save mode, when it is determined that the user requests that the peripheral device enter into the first power save mode.

15. The computer peripheral device of claim 14, wherein the control unit:

determines whether or not the user has requested that the peripheral device exit from the first power save mode; and makes the peripheral device exit the first power save mode, when it is determined that the user requests that the peripheral device exit from the first power save mode.

* * * * *